J. B. Root,
Locomotive.
N° 51,753.     Patented Dec. 26, 1865.

Witnesses.

Inventor.

UNITED STATES PATENT OFFICE.

JOHN B. ROOT, OF NEW YORK, N. Y.

IMPROVEMENT IN LOCOMOTIVES.

Specification forming part of Letters Patent No. 51,753, dated December 26, 1865; antedated December 13, 1865.

*To all whom it may concern:*

Be it known that I, JOHN B. ROOT, of the city, county, and State of New York, have invented a new and useful Improvement in Locomotives; and I do hereby declare that the following is a full, clear, and exact description of the same, reference being had to the accompanying drawings, forming part of this specification.

The object of my invention is to transmit the power from the pistons to two pairs of driving-wheels of a locomotive-engine or locomotive-car truck in a more simple and direct manner than any in which it has heretofore been transmitted; and to this end it consists in the direct connection of the cranks of the two driving-axles on either side of the engine or truck by means of two slotted cross-heads on the same piston-rod, which passes through both ends of a cylinder arranged between the two axles.

To enable others skilled in the art to construct and apply my invention, I will proceed to describe it with reference to the drawings, which represent the application of the invention to the forward truck of a locomotive-car.

Figure 1:
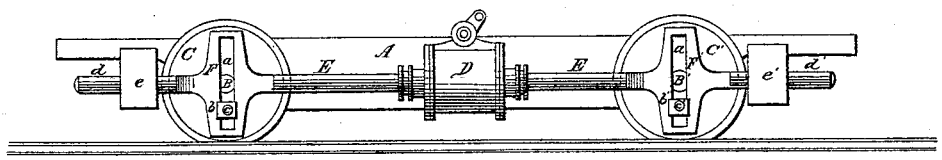
Figure 2:
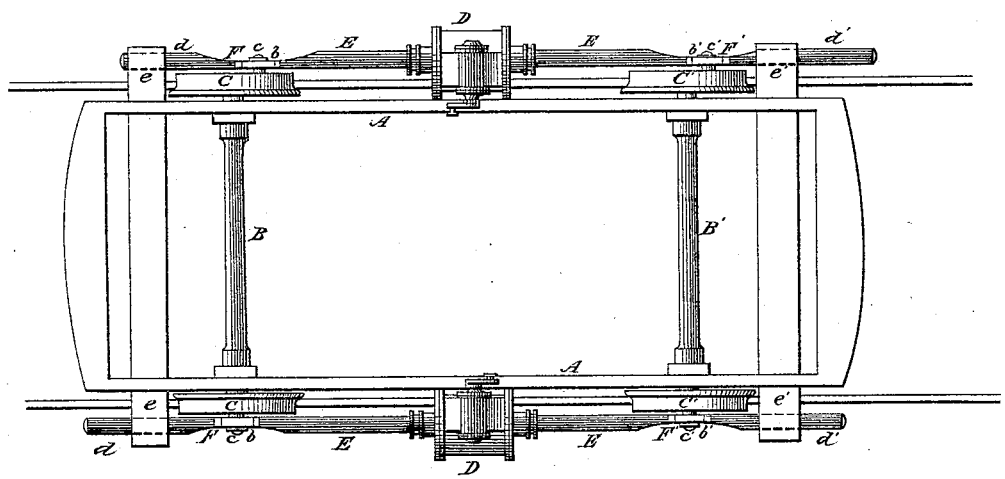

Figure 1 is a side view of the truck. Fig. 2 is a plan of the same.

Similar letters of reference indicate corresponding parts in both figures.

A is the frame of the truck. B B' are the two axles, and C C C' C' the wheels, all of which are drivers.

D D are the steam-cylinders, secured firmly to the outside of the truck, one on each side, midway between the two axles.

E E are the two piston-rods, passing through stuffing-boxes in both ends of their respective cylinders, and each made with or having firmly secured to it two perpendicularly-slotted cross-heads, F and F', the center lines of whose slots *a a'* are at a distance apart equal to the distance between the centers of the two axles. These slots are fitted with sliding boxes *b b'*, in which are formed the bearings for the crank-wrists *c c'*, which are secured in the driving-wheels C C'.

The piston-rods are continued beyond their respective cross-heads, as shown at *d d'*, to work in fixed guides *e e'*, secured firmly to the sides of the truck.

The reciprocating motion of the piston in each cylinder D produces by the action of its respective rod E and cross-heads F and F' the rotary motion of the two crank-wrists *c* and *c'*, on its respective side of the truck, and the combined operations of the two pistons produce the revolution of the four driving-wheels and their two axles, the effect being the same as is produced by the connection of the two pistons with two crank-wrists of one driving-axle and connecting the crank-wrists of the two axles by means of coupling-rods, but the connection being of very much simpler construction. The perpendicular slots *a a'* in the cross-heads provide for the necessary upward and downward movement of the wheels and axles, independently of the truck, in passing over inequalities of the track.

What I claim as my invention, and desire to secure by Letters Patent, is—

The combination of the cylinders D, piston-rods E E, slotted cross-heads F F', driving-wheels C C', crank-wrists *c c'*, sliding boxes *b b'*, guide-rods *d d'*, and guides *e e'*, the whole arranged in relation to the truck or frame A, substantially as herein specified.

JOHN B. ROOT.

Witnesses:
 HENRY T. BROWN,
 GEO. W. REED.